(12) United States Patent
Gabriel et al.

(10) Patent No.: US 7,788,238 B2
(45) Date of Patent: Aug. 31, 2010

(54) EXTENSIBLE OBJECT-MODELLING MECHANISM

(75) Inventors: James Andrew Gabriel, Oxford (GB); John William Anderson, Wellington Mill (AU)

(73) Assignee: digitalML Ltd, Staines (GB)

( * ) Notice: Subject to any disclaimer, the term of this patent is extended or adjusted under 35 U.S.C. 154(b) by 258 days.

(21) Appl. No.: 11/258,416

(22) Filed: Oct. 25, 2005

(65) Prior Publication Data

US 2006/0101038 A1    May 11, 2006

(30) Foreign Application Priority Data

Oct. 25, 2004   (GB)   ................... 0423656.8

(51) Int. Cl.
*G06F 7/00* (2006.01)
*G06F 17/30* (2006.01)
*G06F 9/44* (2006.01)

(52) U.S. Cl. ...................... 707/695; 707/803; 717/168; 717/101; 717/108; 717/116

(58) Field of Classification Search ................ 707/101, 707/100, 102, 103, 999.1, 999.102, 999.103, 707/695, 803; 717/101, 108, 116, 100, 104, 717/111, 124, 168
See application file for complete search history.

(56) References Cited

U.S. PATENT DOCUMENTS

| 6,569,207 | B1 | 5/2003 | Sundaresan | |
|---|---|---|---|---|
| 2002/0073399 | A1 | 6/2002 | Golden | |
| 2003/0014442 | A1* | 1/2003 | Shiigi et al. | ................. 707/513 |
| 2004/0181425 | A1* | 9/2004 | Schwerin-Wenzel et al. | ... 705/1 |
| 2005/0091231 | A1* | 4/2005 | Pal et al. | ..................... 707/100 |

FOREIGN PATENT DOCUMENTS

WO   WO 01/95155   12/2001

OTHER PUBLICATIONS

"Introduction to CorteXML, CorteXML V2.1" Revision 0, Gabriel, James A., BarbadoSoft, 2002.*
"CorteXML—missing piece of XML puzzle," Software World magazine, vol. 22 No. 1, Jan. 1, 2002, p. 22, A.P. Publications Ltd.*
capture of http://www.barbadosoft.com showing CorteXML product from Nov. 27, 2001, retrieved via www.archive.org on May 22, 2009.*
Conference Sessions for XML Conference & Exposition 2001 for Thursday Dec. 13, 2001 showing "Schema Evolutionand Versioning for XML" presentation, from http://www.gca.org/xmlusa/2001/thursday.htm, retrieved via www.org on May 20, 2009.*
Search Report for Foreign Priority Application (GB 04236568).

(Continued)

*Primary Examiner*—James Trujillo
*Assistant Examiner*—Bruce M Moser (57) ABSTRACT

An XML management system, comprising: a repository configured to store a manipulable object model capable of representing metadata about objects in a user's computing environment; user accessible means for manipulating said object model to modify properties of objects thus represented; and means for extending said object model to handle a new type of object by automatically generating descendent class(es) that are able to handle the new object within the object model and incorporating them into an XML management system runtime environment for participation in the object modelling process.

7 Claims, 5 Drawing Sheets

OTHER PUBLICATIONS

Frazer Robinson, "Experts Advise 65% of All IT Project Budget Should Be Reserved for Maintenance," Barbadosoft Newsletter, vol. 2, No. 3, pp. 2-3 (Nov. 2001).

Barbadosoft Newsletter, vol. 2, No. 3 (Nov. 2001).

Jim Gabriel, "Schema evolution and versioning for XML," XML 2001, Orlando (Dec. 13, 2001).

"Release Notes for CortexML 4.0.0," (Nov. 2005).

* cited by examiner

```xml
<?xml version='1.0' encoding='UTF-8'?>
<xsd:schema targetNamespace=http://www.example.com/IPO
        xmlns:xsd=http://www.w3.org/2001/XMLSchema
        xmlns:ipo="http://www.example.com/IPO">
  <xsd:include schemaLocation="address.xsd"/>
  <xsd:include schemaLocation="credit.xsd"/>
  <xsd:element name="order">
    <xsd:complexType>
      <xsd:sequence>
        <xsd:element name="customer" type="xsd:positiveInteger"/>
        <xsd:element name="date" type="xsd:date"/>
        <xsd:element name="items" type="ipo:Items"/>
        <xsd:element name="shipping" type="ipo:Shipping"/>
        <xsd:element name="payment" type="ipo:Payment"/>
      </xsd:sequence>
      <xsd:attribute name="orderID" type="xsd:positiveInteger"/>
    </xsd:complexType>
  </xsd:element>
  <xsd:complexType name="Items">
    <xsd:sequence>
      <xsd:element name="item" minOccurs="1" maxOccurs="unbounded">
        <xsd:complexType>
          <xsd:sequence>
            <xsd:element name="productName" type="xsd:string"/>
            <xsd:element name="productID" type="xsd:string"/>
            <xsd:element name="quantity" type="xsd:positiveInteger"/>
            <xsd:element name="price" type="xsd:decimal"/>
          </xsd:sequence>
        </xsd:complexType>
      </xsd:element>
    </xsd:sequence>
  </xsd:complexType>
  <xsd:complexType name="Shipping">
    <xsd:sequence>
      <xsd:element name="name" type="xsd:string"/>
      <xsd:element name="address" type="ipo:Address"/>
      <xsd:element name="shipSpeed">
        <xsd:simpleType>
          <xsd:restriction base="xsd:string">
            <xsd:enumeration value="normal"/>
            <xsd:enumeration value="business"/>
            <xsd:enumeration value="overnight"/>
          </xsd:restriction>
        </xsd:simpleType>
      </xsd:element>
      <xsd:element name="comment" type="xsd:string" minOccurs="0"/>
    </xsd:sequence>
  </xsd:complexType>
  <xsd:complexType name="Payment">
    <xsd:sequence>
      <xsd:element name="name" type="xsd:string"/>
      <xsd:element name="paymentType">
        <xsd:complexType>
          <xsd:choice>
            <xsd:element name="giro" type="xsd:positiveInteger"/>
            <xsd:element name="creditcard" type="ipo:CreditCard"/>
            <xsd:element name="bill" type="ipo:Address"/>
          </xsd:choice>
        </xsd:complexType>
      </xsd:element>
      <xsd:element name="itemTotal" type="xsd:decimal"/>
      <xsd:element name="shippingTotal" type="xsd:decimal"/>
      <xsd:element name="totalPrice" type="xsd:decimal"/>
    </xsd:sequence>
  </xsd:complexType>
</xsd:schema>
```

EXTENSIBLE OBJECT-MODELLING MECHANISM

BACKGROUND

The present invention relates to the management of the maintenance and development of interdependent software systems, and in particular of software systems that implement information exchange over a network, such as the internet.

Different computer systems and the databases they contain will often store data in incompatible formats and a time-consuming problem for developers has been how to exchange data between such systems efficiently. The XML standard (standing for eXtensible Markup Language) was designed to solve this problem and is now extensively used in computing and data management. XML is a markup language similar to HTML but designed specifically to describe data rather than display it. By storing data as XML definitions in an XML file, it is possible to achieve a cross-platform, software and hardware independent tool for transmitting information. All that system developers within the XML environment require in order to provide programs that are compatible for the purposes of data exchange is one or more XML schemata that define the required structure of the XML data file. The XML schemata include declarations of data structures and constraints of the XML object definitions to be contained therein.

The maintenance of complex software systems in conventional programming languages is facilitated by the provision of source control, version control, and team development facilities for multiple developers. However, these benefits are not easily extendable to the definitions of XML objects due to the unique nature of XML itself. XML is not a programming language, and therefore has no source code. Source control and version control of XML objects are therefore meaningless concepts in a conventional sense. However, these concepts are desirable, because a robust infrastructure for team development of software must contain comprehensive support for source control and version control of all objects developed by the team.

As mentioned above, XML provides a mechanism for declaring the data structures and constraints of named objects in schemata. The relationship between the definition of objects in XML and their use in the deployed software systems based on that XML is not analogous to the way the source code of a conventional programming language is compiled to create executable software for deployment. Rather, deployed XML systems are constructed from the XML definitions defined by the developer (schemata, transformations and so on), and multiple references to single objects are a necessary feature of any deployment implementation.

Controlling the evolution of complex XML environments is difficult because there is no easy way of charting exactly where or how everything defined in the XML definitions is actually referred to or used. This situation is further complicated by the fact that XML is invariably used either in conjunction with non-XML objects, or to describe non-XML objects, which are managed in another environment. Developers do not have access to a road map, or conceptual model of the entire system. Developers maintain the XML part of a system by working on the XML definitions themselves with little or no abstraction, which becomes a problem when single objects can be referred to or used in multiple, unpredictable places.

With no easily applicable mechanism for source control and version control, support for team development is effectively not possible. The consequences—when compared with conventional programming languages and development environments—are increased risk of error, increased development effort, and unpredictable effects when changes need to be made. Evolution of XML-based environments is therefore hazardous, particularly when those environments are complex and maintained by multiple developers.

It is an object of the present invention to facilitate the evolution of XML-based software systems, including providing a mechanism to apply source and version control to XML objects in a team development environment.

According to an aspect of the invention, there is provided an XML management system, comprising: a repository configured to store a manipulatable object model capable of representing metadata about objects in a user's computing environment; user accessible means for manipulating said object model to modify properties of objects thus represented; and means for extending said object model to handle new types of object by automatically generating descendent class(es) that are able to handle the new object within the object model and incorporating them into an XML management system runtime environment for participation in the object modelling process. The repository gives developers and administrators a database of metadata for the XML parts of their environments and is easily extendable to incorporate new types of object. The stored information makes it possible to chart all the relationships between objects in a true single-source view of the world, both in a development environment and in a deployed system. The metadata can be used to analyse the impact and predict the cost of change to the described system, and potentially to automate the implementation of change.

The XML management system may further comprise an import interface, capable of parsing incoming data streams comprising new non-XML objects and regenerating said object model to include said new non-XML objects. This feature provides a fast and efficient process by which non-XML objects can be incorporated into the object model without requiring extensive manual programming by a user or XML management system maintenance team.

The extensible, version-aware object model according to embodiments of the invention enables version control and source control to be applied to objects at the object-level. It also provides a high-level, object-oriented view of all the objects used in the system. An object in this model is truly a single-source object, therefore, however many times it is referenced or deployed in some way or other. The object model gives many advantages.

For example, property sets, such as style information, associated Java classes, and so on can be attached to individual objects before they are deployed into physical implementations of the logic.

From a pool of single objects, it is possible to build deployable 'structures' that are equivalent to schemata (or schema fragments), and publish them in the same way that a conventional software system would be built by compiling it from an identifiable code baseline. These may be referred to as 'published contexts', meaning the contexts in which we know that any given object is actually used.

It is also possible to identify where a system will break if an object in the model of the objects is changed, providing information about: which deployed structures (published contexts) are affected; where those structures are used in the system; and therefore, which parts of the system will break.

Finally, it is possible to version schemata and other exported output by versioning the objects in the schemata and applying a build mechanism to the set of objects that comprises a coherent, consistent set of deployable output.

The invention makes it possible to use a registry mechanism (associated with the use of a repository) to record where objects in the repository have come from, or been deployed. When developers need to change existing definitions, the system can therefore provide impact analysis, automated generation or regeneration of deployment environments, versioning of any object in the system, and change management for deployed environments.

Once the repository and object modelling environment exists according to embodiments of the invention, it is a relatively straightforward programming task to enable team development by introducing a user administration layer (groups, roles, permissions). A task-based check-in/check-out workflow can ensure safe conflict resolution both locally in users' private workspaces and centrally, in the shared repository.

According to a further aspect of the present invention, there is provided a system for developing and managing XML objects, comprising:

an interactive, on-screen, computer environment;

an extensible object model capable of representing objects and metadata about objects;

wherein the system includes a framework of object classes which effect the manipulation of objects within said object model in response to user interaction and the persisting of objects between sessions in said environment; and the system is updatable to handle a new type of object by the generation of the source code of one or more descendant classes of said object class framework, which descendant class or classes is adapted to the manipulation and persisting of said new type of object, whereby objects of such new type can then participate in said object model.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 5 depicts an example XML schema file regulating customer order details in an online purchasing environment.

DETAILED DESCRIPTION

Figure 1:
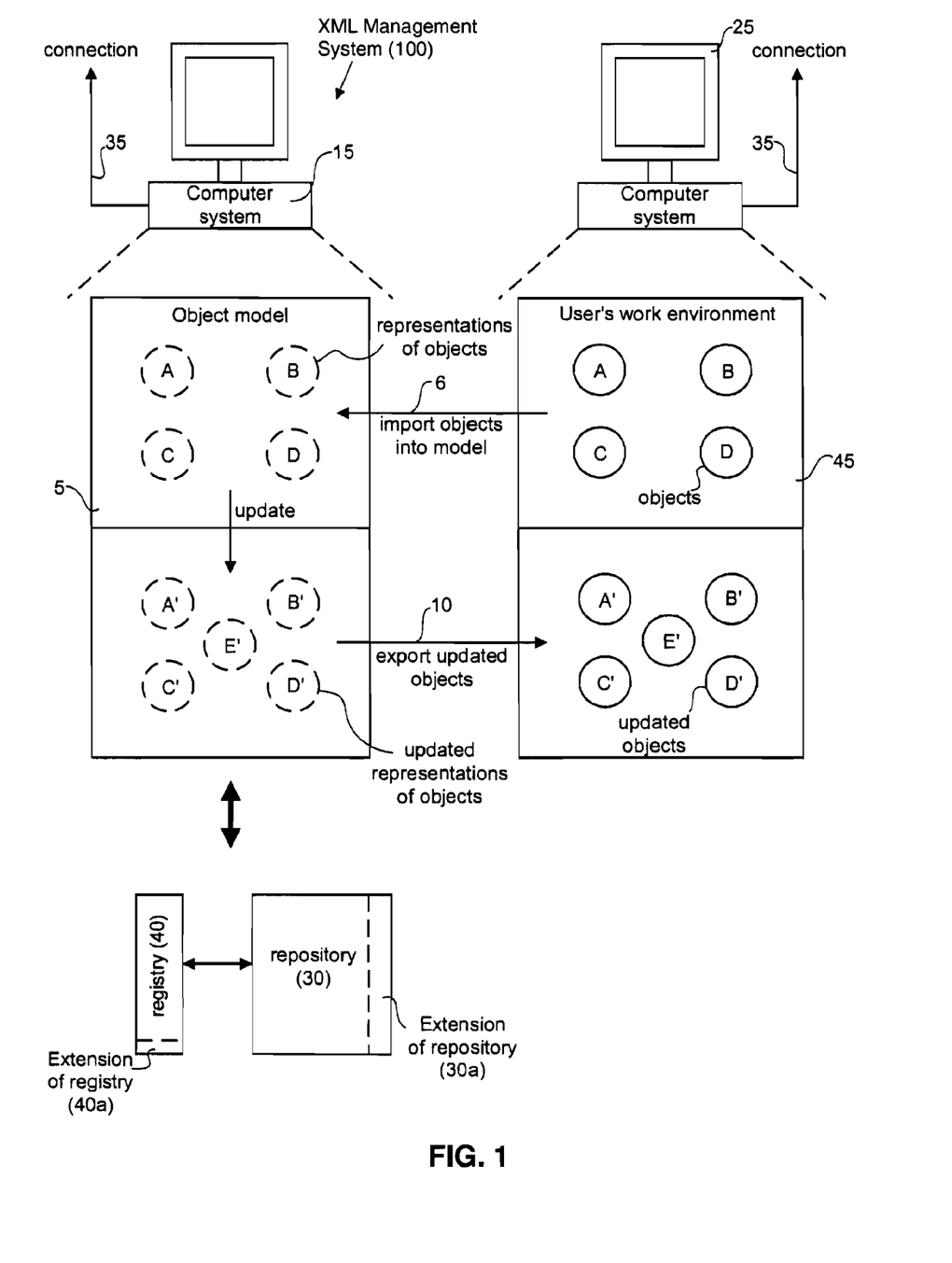
FIG. 1 depicts an XML management system according to an embodiment of the invention, comprising an extensible object model, registry and repository, and shown interacting with objects in a users computing space.

An XML management system 100 according to an embodiment of the invention is shown in FIG. 1. The system 100 comprises an extensible object model 5 stored in an extensible database 30 controlled by a registry 40. The XML management system 100 may be implemented via a computer system 15 and may be arranged to be accessible via a connection 35 from a system of remote computers 25 that interact with each other using XML and non-XML objects modelled by said XML management system 100, or to a computer controlling a portion of such a system. As will be described in more detail below, the management of these objects, and in particular updates or changes to these objects, forms an important part of the functionality of the XML management system 100. This aim is achieved by providing to users a means to manipulate an abstracted form (a model) of objects centrally (in the present embodiment, via computer system 15) rather than having to manipulate the deployed objects themselves (or direct copies of the objects) as would be required in prior art arrangements. This centralised approach allows vital management functions such as source and version control to be applied to objects effectively, via their representation in the object model.

According to an embodiment of the invention, extension of the object model to incorporate new objects does not interfere with this process, with management functions being equally applicable to the extended model. Changes to an object may be carried out by editing the object as it is represented in the object model 5. This is facilitated by reference to the results of management functions applied to the object model. The process is illustrated schematically in FIG. 1. A user controlling computer system 25 requires XML and non-XML data objects A, B, C and D (depicted in the upper box of the user's work environment 45) as part of an XML-based software system. These objects are imported into the XML management system 100 via data-path 6 and incorporated into the object model 5 as will be described in more detail below. The representations of the objects A, B, C and D are depicted within the object model 5 as broken circles. The user can then manipulate the representations of his objects, aided by management functions, to create updated objects A', B', C' and D' and even add new objects, such as E', within the object model. Once the editing process is complete for a given development phase, the XML management system 100 can be made to regenerate the required objects for a user's application(s). In the present embodiment these are exported ("deployed") via data path 10 as new objects A', B', C', D' and E' in the lower box of the user's work environment 45.

The object model according to an embodiment of the invention is implemented and stored in the repository 30, which is a database containing fine-grained definitions of all objects and their relationships and other properties in the object model. The repository 30 contains objects that can be edited, renamed, deleted, referenced by other objects, and so on. Every single object imported into or created manually in the XML management system 100 exists in the repository 30. Every time a modification is made to an object, a new version is created of the object in the repository 30. No old versions are thrown away. The repository 30 is the technical mechanism that is necessary to support a model-driven architecture. Model-driven XML development separates the model of an application from the actual implementation.

The registry 40 is a record of deployable objects (schemata, transformations, and any proprietary non-XML object also included in the model). Deploying an environment from the repository 30 is a repeatable 'deployment' action. The registry mechanism provides a way of remembering what has been deployed, who deployed it, where all the definitions came from, and so on. The registry contains the equivalent of architect's drawings for deployed releases, but not the "bricks and mortar" that go into building the thing described by the drawings.

All new objects that are imported into the XML management system 100 are described in terms of extensions of known object classes. This arrangement makes it possible to extend the object model indefinitely and still allow the application of a uniform set of management functions as described above.

The way in which new objects are incorporated into the XML management system 100 according to an embodiment of the invention depends on the degree of complexity of data the new object is intended to deal with.

A simple object may be stored as a "custom object", which is a built-in part of the object model. Custom objects are configured to act as a container for arbitrary binary data, which is stored in the database 30 as a blob. Custom objects can be versioned or unversioned. Custom objects can be created dynamically by amending configuration files, no change to the actual object model 5 or database schema being required. As such, it is possible for an end user to create and use custom objects on an already deployed system without assistance or intervention from the programmers or maintenance team of the XML management system 100. Custom objects are particularly useful when binary data associated with schema objects under the XML management system 100 must be managed alongside those objects. An example might be an image.

When more complex data other than just a blob must be stored, or there is a need to manipulate and react to the properties of a new class of object, a "proprietary object" is required. Proprietary objects are tightly integrated with the standard object model (and become indistinguishable from standard model objects. They are created in the same way as standard model objects by defining their properties in an internal configuration file. An XML management system core generator then creates the classes for the standard and proprietary objects, which are then incorporated into the core of the XML management system 100.

Figure 2:
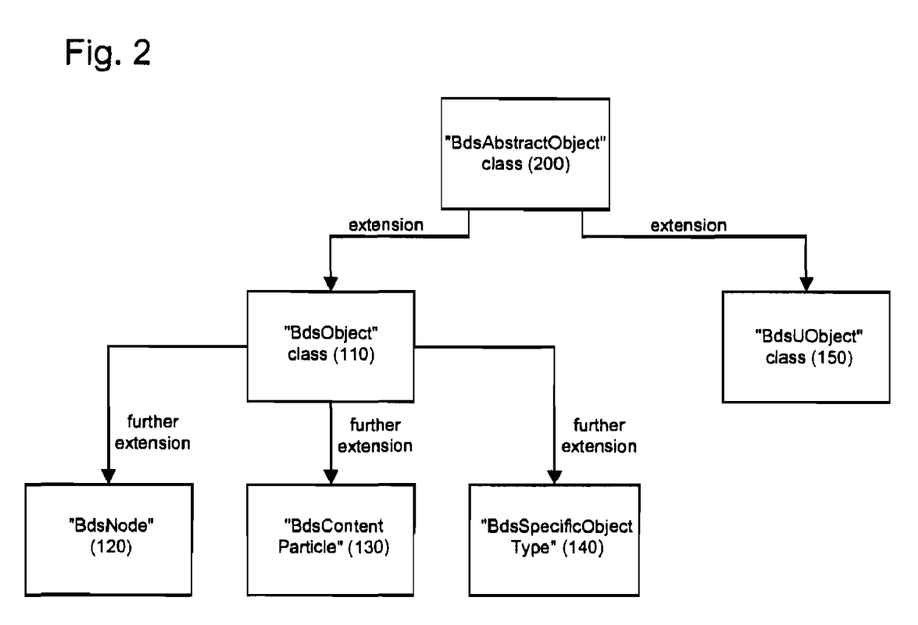
FIG. 2 depicts version control according to an embodiment of the invention.

The extension of the object model according to an embodiment of the invention is described below with reference to FIG. 2.

According to this embodiment, all objects in the object model extend the 'BdsAbstractObject' object class 200, which captures the minimum set of metadata required to describe any object in a software system.

When the management functions described earlier are applicable to an object, the object also extends the 'BdsObject' class 110 and thus inherits version and variation attributes that allow source control and version control to be applied.

When the management functions are not applicable—for example, container objects such as modules and cabinets do not need to be version controlled—the object extends the 'BdsUObject' 150 class instead, and thus inherits attributes applicable to container objects and none of the version and variation attributes of BdsObject 110.

Further extensions for objects for which management functions are applicable are BdsNode 120, BdsContentParticle 130, and BdsSpecificObjectType 140. BdsNode 120 contains the attributes that enable an object to be included in a tree structure as a node. BdsContentParticle 130 contains the attributes that enable the object to describe something that has content.

BdsSpecificObjectType 140, where SpecificObjectType is the type of non-XML object that can be added to the object model—such as a proprietary expression of a business rule language, contains the object-specific attributes that capture all the metadata about a specific object type that is needed to describe the object sufficiently for import, editing, and export purposes. For example, in the known and supported set of XML objects already defined in the model, an inbuilt extension may be provided that contains the set of attributes that describes all metadata specific to an XML element, to an XML attribute, etc. When extending the model with a new object type, the only new class required is the BdsSpecificObjectType 140 to cater for the specific set of attributes for the new object type.

To persist a new object type in the repository 30, the core generator builds the relevant extensions to the repository 30 without any need for human intervention. Relationships between objects are handled via tuples in a link table, which is a robust and well-understood method for object-to-relational database storage. This method of capturing relationships has the essential property of being impervious to changes in the surrounding object model.

There are two types of relationships between objects: ownership and reference.

In the case of ownership, a parent object creates the child object. When the parent is deleted, the child is also deleted. An object can also reference another object that it does not own. In this case, the first object is called the tree parent. When the tree parent is deleted, the tree child remains in the system.

Furthermore, there is a distinction between "single links" and "collections". For example, an element has only one complex type. Therefore, a "single link" is provided between element and complex type to store this relationship. On the other hand, a module can have many elements, which are stored as collections. There are three types of collections: lists, sets, and name maps.

Lists are ordered collections. For example, a model group has a list of content particles, which must be stored in a certain order.

Sets are unordered collections with no repeated items. For example, an attribute group has a set of attribute particles. Attribute particles do not have to be stored in a specific order, but can contain no repeats.

Name maps are collections indexed by name. They ensure name uniqueness. For example, a module has a name map of elements. There can be only one element of a given name in a module.

In the repository database 30, link tables contain fields for the link name, source object link ID and destination object link ID.

The object model is extensible in the sense that new types of object, including objects written in non-XML languages, may be incorporated into the XML management system 100 without breaking either the object model 5 or the database/registry 30/40. The following example illustrates a part of a system which involves non-XML objects as well as XML ones and how the system 100 handles the non-XML objects.

The XML standard defines a meta-language for creating specific grammars for describing data in various application-specific domains but it does not define how that grammar is to be displayed for human access to the information it describes via a web page. W3C Cascading Style Sheet (CSS) is a standard for adding style (fonts, colors, spacing, for example) to Web documents that may themselves be generated from an XML data source. The following example of a style sheet illustrates CSS syntax for making all paragraph ('P') elements rendered using 12 point Times New Roman:

p {font-family: Times New Roman; font-size: 12pt}

The system 100 contains a core set of classes that embody the object model for all the types of objects that the system can import, persist and export. The source code for the majority of these classes is auto-generated as part of the standard product build process. The names, attributes and relationships of the generated classes are defined in an XML configuration file.

When an engineer runs the product build process, the first component built is the core generator. The core generator is then automatically executed, which results in the core configuration file being read and source files being generated for every object type described therein. The core of the product (including both static classes and generated classes) is then compiled. The rest of the product is then built on top of the compiled core.

The classes created by the core generator typically extend the static BdsObject class, thereby inheriting basic attributes and behaviour for adding and removing child objects, reparenting the object, querying the object's ancestor and descendant hierarchy, and obtaining iterators that iterate over collections of the objects. The core generator also generates the iterator code specific for the object as well as the necessary database definition language statements to create the database tables to hold persistent representations of the objects.

A CSS Font declaration includes attributes that describes a font family, a font style, weight, variant, size and colour. Accordingly, the core configuration definition for a CSS Font object that describes these attributes might look like the following:

```
<class name="font" extends="object">
    <data type="String" name="family"/>
    <enum type="int" name="STYLE_NORMAL" value="0" desc="The constant that represents a normal font style."/>
    <enum type="int" name="STYLE_ITALIC" value="1" desc="The constant that represents an italic font style."/>
    <enum type="int" name="STYLE_OBLIQUE" value="2" desc="The constant that represents an oblique font style."/>
    <data type="int" name="style"/>
    <enum type="int" name="VARIANT_NORMAL" value="0" desc="The constant that represents a normal font variant."/>
    <enum type="int" name="VARIANT_SMALL_CAPS" value="1" desc="The constant that represents a small-caps font variant."/>
    <data type="int" name="variant"/>
    <enum type="int" name="WEIGHT_NORMAL" value="0" desc="The constant that represents a normal font weight."/>
    <enum type="int" name="WEIGHT_BOLD" value="1" desc="The constant that represents a bold font weight."/>
    <enum type="int" name="WEIGHT_BOLDER" value="2" desc="The constant that represents a bolder font weight."/>
    <enum type="int" name="WEIGHT_LIGHTER" value="3" desc="The constant that represents a lighter font weight."/>
    <enum type="int" name="WEIGHT_100" value="4" desc="The constant that represents an absolute font weight of 100."/>
    <enum type="int" name="WEIGHT_200" value="5" desc="The constant that represents an absolute font weight of 200."/>
    <enum type="int" name="WEIGHT_300" value="6" desc="The constant that represents an absolute font weight of 300."/>
    <enum type="int" name="WEIGHT_400" value="7" desc="The constant that represents an absolute font weight of 400."/>
    <enum type="int" name="WEIGHT_500" value="8" desc="The constant that represents an absolute font weight of 500."/>
    <enum type="int" name="WEIGHT_600" value="9" desc="The constant that represents an absolute font weight of 600."/>
    <enum type="int" name="WEIGHT_700" value="10" desc="The constant that represents an absolute font weight of 700."/>
    <enum type="int" name="WEIGHT_800" value="11" desc="The constant that represents an absolute font weight of 800."/>
    <enum type="int" name="WEIGHT_900" value="12" desc="The constant that represents an absolute font weight of 900."/>
    <data type="int" name="weight"/>
    <enum type="int" name="SIZE_MEDIUM" value="0" desc="The constant that represents a medium font size."/>
    <enum type="int" name="SIZE_XX_SMALL" value="1" desc="The constant that represents a xx-small font size."/>
    <enum type="int" name="SIZE_X_SMALL" value="2" desc="The constant that represents a x-small font size."/>
    <enum type="int" name="SIZE_SMALL" value="3" desc="The constant that represents a small font size."/>
    <enum type="int" name="SIZE_LARGE" value="4" desc="The constant that represents a large font size."/>
    <enum type="int" name="SIZE_X_LARGE" value="5" desc="The constant that represents a x-large font size."/>
    <enum type="int" name="SIZE_XX_LARGE" value="6" desc="The constant that represents a xx-large font size."/>
    <enum type="int" name="SIZE_LARGER" value="7" desc="The constant that represents a larger relative font size."/>
    <enum type="int" name="SIZE_SMALLER" value="8" desc="The constant that represents a smaller relative font size."/>
    <enum type="int" name="SIZE_LENGTH" value="9" desc="The constant that represents an font size of an exact length. The font value and font unit indicate the exact length."/>
    <enum type="int" name="SIZE_PERCENTAGE" value="10" desc="The constant that represents a percentage font size in relation to parent element."/>
```

-continued

```
        <data type="int" name="size"/>
        <data type="int" name="value"/>
        <enum type="int" name="UNIT_PT" value="0" desc="The constant that
represents a font unit in points."/>
        <enum type="int" name="UNIT_IN" value="1" desc="The constant that
represents a font unit in inches."/>
        <data type="int" name="unit"/>
        <data type="String" name="color"/>
        </class>
```

When the core generator is run as part of the product build process, the interfaces and implementations for BdsFont.java and BdsFontBean.java are automatically generated as a result of reading this definition. BdsFont extends the BdsFontBean class. The BdsFontBean class includes Java representations for the attributes defined in the core configuration file, as well as accessor and mutator methods that can read and modify their values and factory methods for creating new object instances.

With these core building blocks in place, the implementor of the new Font object type is able to write custom code that handles the importing and exporting of CSS files into and out of the model, custom editors for editing the object via the graphical user interface and impact change listeners which handle change events fired on the new objects.

To handle import, the developer writes a filter class that parses the CSS format, translates this to objects that the system understands and then calls generated factory methods to create new object instances.

Defining an editor to edit the object properties usually requires simply using the standard BdsDefaultEditor class, supplying it with the editable object properties specific to the new object type. This can be done through a configuration file rather than writing new code.

As part of incorporating the Font object type into the object model, the system will automatically arrange for change events to be fired when particular objects are impacted by actions performed by the user of the system. How these events should be managed varies depending on the type of object. Custom handling for this behaviour is achieved by the developer writing a class that extends the AbstractImpactListener class and providing an implementation of the change( ) method. The impact listener is then registered with the system by modifying the impact listener configuration file.

To export the object, the developer writes a filter class that follows the reverse of the process followed during import, where the object model is queried for attributes which are transformed into their external CSS style sheet representation.

Of course, the system 100 can be extended to handle more complex non-XML objects and situations. For example, one type of non-XML object might be the source code of a module which operates on other objects in the model of system X in some computer language, e.g. C++ or Java. Depending on the language of the source code and how the module is written, the module may contain instances of names which, depending on context, may correspond to the same names in the XML objects, or might simply be identifiers (or reserved words). For example, it might be the case that names which appear in the source code as quoted text strings are taken to be references to object names within the model of X whereas non-quoted ones are taken to be unrelated and should be left alone.

An XML-based software environment means any software application environment where XML is used. XML is always used in combination with other technologies, and never in a pure XML-only way. Such environments fall into various categories, all of which tend to have specific needs. Examples include Dynamic publishing and content management, E-government applications (allowing interaction with the government via the internet, such as for tax affairs, vehicle administration, healthcare, etc.), Business-to-business trading environments, and Enterprise Application Integration environments (which allow disparate software systems to interact with each other as if they were one system). In each case, the parts that are important in respect to the XML are the parts that are sensitive to changes in the system. These parts are either represented at some point in XML, or would be affected—directly or indirectly—by modifications to the definitions of the XML, or would themselves break the associated XML if modified.

Effective management of the evolution of an XML-based software system is achieved according to an embodiment of the invention by applying management functions to objects in the object model 5 as mentioned above. The management functions may include: source control, version control, impact analysis and change management. Each is described in more detail below.

Source control means controlling an object by controlling something that can be used to generate the object. In a conventional programming environment, this is source code. The source code in a conventional programming environment is controlled by providing a database mechanism for storing it when it is not being edited, and allowing a programmer to check it out and modify it and check it back in again in a controlled way. Source control ensures that there is only ever one instance of a piece of code.

In XML, there is no source code. The XML management system 100 can be arranged to provide source control for the objects described in XML by allowing developers to work on an abstraction of any given object in an object model stored in the repository 30.

The XML management system 100 handles all object definitions as source definitions in a conventional programming sense. The repository 30 is divided into 'cabinets', which are the logical boundaries for data in the XML management system 100. The XML management system may manage the evolution of complex XML-driven applications via software releases, similar in concept to releases of products. The XML management system 100 uses cabinets to store all the work that constitutes a release. A cabinet is a multi-user concept: cabinets belong to user groups, and all users in the group can access all the cabinets owned by the group. Users with the Administrator role in a user group manage cabinet-level work (builds, releases, deploying new versions, and so on).

Developers working with schema objects do their work in private workspace areas known as 'projects'. Each developer can have one or more projects. A project is a single-user concept. A project can check out and check in work on a read-write basis with one cabinet.

A base cabinet build is the starting point for any project. A user task is the space in which one or more modifications is made. An integrated (completed) task results in a new build of the cabinet containing the objects. Once a task is complete and a new build available, the latest definitions of the objects in that cabinet become available for use or further modification to other projects. When a cabinet is built, the current version of each object in the cabinet is added to a build descriptor. The act of deploying effectively becomes the definition of releases, therefore, choosing a specific build for a release.

Figure 3:
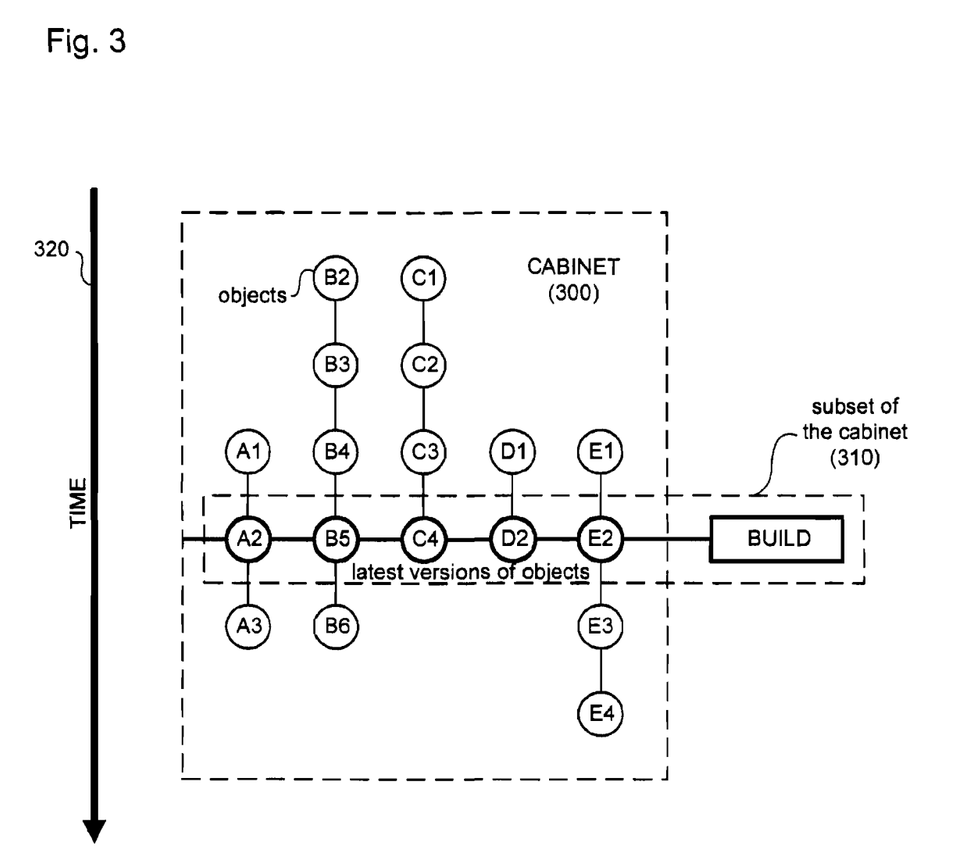
FIG. 3 depicts a class diagram illustrating how the object model according to an embodiment of the invention extends object classes in order to encompass a new object and still allow uniform application of management functions.

Version control is essential when you need to support team development, because multiple developers work in parallel on shared object definitions, and multiple versions of objects tend to result. According to an embodiment of the present invention, parallel development is supported through object-level versioning and conflict resolution at check-in time. FIG. 3 provides a schematic illustration of a how this may be implemented in relation to a time axis depicted as arrow 320 (increasing in the downwards direction). A cabinet 300 in the XML management system 100 contains all the versions of all the objects (A1 to E4) within the cabinet 300. A build made in a cabinet 300 consists of a subset 310 of the cabinet 300, containing the latest version of each object (A2, B5, C4, D2 and E2) in all the tasks integrated in that build.

Modelling objects in the XML management system 100 ensures that dependencies between objects are tracked to provide the necessary impact analysis before changes are committed. Impact analysis minimizes the risk inherent in changes. It allows the user to listen in on changes, and veto or act on them. Impact analysis makes it possible to carry out "what if?" project planning, and predict the cost of change.

When a change event happens, an impact analysis tool identifies relevant impacted objects and reports these to impact listeners.

Figure 4:
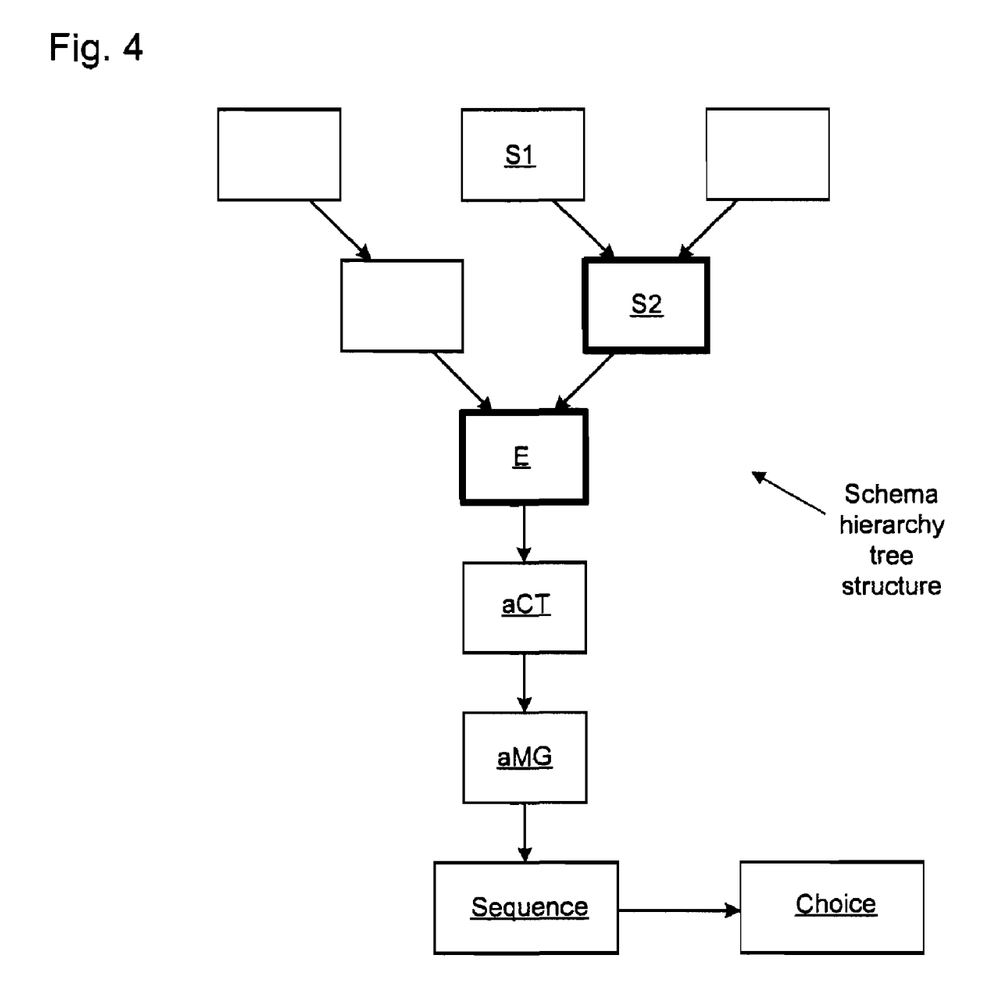
FIG. 4 depicts impact analysis according to an embodiment of the invention.

For example, in FIG. 4, which shows a schema hierarchy tree structure (where 'aCT' represents an XML schema complex type and 'aMG' represents a model group) schema S1 references schema S2, which contains an element, E. A change event is triggered on the structure content of element E (the top level model group is being changed from a sequence to a choice). A back reference tree walker is set off from the sequence, walking up the tree. Element E is reported (marked with a bold outline), as it is the first element reached from the sequence. Schema S2 is reported as it contains element E and is thus marked as modified (bold outline). This means that all the schema instances associated with this schema are no longer valid and must be redeployed. However, schema S1 is not reported, because schema S1 is not directly impacted and therefore does not need to be redeployed.

The XML management system 100 manages change by offering a configurable method for reacting to change events. Every object in the repository 30 is arranged to produce a modification event signal when modified. Listeners are provided that are configured to launch suitable action (a change event) on receiving the modification event signal.

Changes to standard objects in the XML management system 100 (schema objects, mapping rules, and so on) trigger an impact analysis module. By default, the rest is up to the user, options including to accept (or veto) the change, to integrate the change, or to re-deploy the environment.

Once an object has been incorporated in the object model, it may be assembled as a model object into deployable objects (such as schemata) during an assembly phase. Schemata in this context are deployable objects, which group together objects into namespaces. Schemata contain model objects (modules and nodes) and reference other schemata. They are created by and owned by a namespace. The namespace defines the set of model objects available to the schema. Model objects from other namespaces can be imported via referenced schemata. Schemata can be deployed in different schema formats. The deployment/publishing process results in the creation of schema instances which are specific to the release that has been defined in the cabinet containing the work of a team.

A schema record as implemented in the XML management system 100 contains information such as the format, file location, and last deployed time. Also, specific to each schema instance are such properties as the public and system identifiers (reference location), whether the target namespace has been used, and the defaults for 'element qualified,' 'attribute qualified,' 'final,' and 'block' (XML schema properties).

A consistency tool may be provided to facilitate the process of assembling schemata. After assembly, schemata can be checked for consistency in various schema formats. There are many ways a schema can be inconsistent. First of all, object consistency, where all objects referenced within the schema must be part of the schema itself or contained in a referenced schema, is checked. Namespace consistency implies that the target namespace string in a schema is not used for more than one namespace object by referenced schemata. Prefix consistency implies that the prefix in a schema is not used for more than one target namespace string by referenced schemata. Finally, for DTDs (Document Type Definitions), name consistency ensures that there are no name clashes among global and local elements—which are both exported as global—and between global complex types, model groups, and attribute groups—all of which are exported as parameter entities.

FIG. 5 shows an example schema file which describes an order that a customer might make in an online purchasing environment. All elements are declared using the element word. Namespaces are referenced in the code, which, as discussed above, provide a means for describing a space within which names shall be unique. A complex type is an identified structure of elements with a certain order and content. "Choice" and "sequence" describe the content of an element when that content is a structure of other elements, and attributes are properties of elements.

An important advantage of the XML management system 100 is that it can be adapted to represent new environments or changes to existing environments. This is achieved via a business interface, which provides an import/export mechanism for connection to new processes and places. By importing all the schemata in a given environment, for example, the updated object model 5 within the XML management system 100 can be used to generate a model of that environment. Importing and exporting objects can be a manual or an automated process. For example, to start a large project, it may be preferable to employ a batch process to import all the schemata that a user owns into the XML management system.

The object import/export interface comprises filters that parse incoming (imported) data streams and create a suitable object model 5 in the XML management system 100 (the filters effectively act to convert the "foreign" data being imported into equivalent object model representation). When exporting, the object input/export interface uses the same mechanism in reverse to generate deployed artifacts from an object model 5.

The XML management system 100 is configured to import an XML schema (XSD) by creation of model objects, such as elements and attributes, in the repository 30. During import, the definitions in each schema file are gathered into a 'module'. A module contains nodes. A node is essentially equivalent to an object in the object model 5. Nodes can be divided into the following categories in the system 100: content particles; attribute particles; types and facets; notations and entities; annotations; and keys. Each category is discussed below in turn.

Content particles represent structure content. They can be elements, model groups, or any's (wildcard structure). Elements correspond clearly to the element tag in XML Schema and ELEMENT definition in DTD. Model groups hold content particles, and correspond to the sequence, choice, all, and group tags in XML Schema, and to sequences (,) and choices (|) in DTD. Any's correspond to the any tag in XML Schema, and ANY content in DTD.

Attribute particles can be attributes, attribute groups, or any attributes (wildcard). Attributes correspond clearly to the attribute tag in XML Schema and attribute definition in DTD. Attribute groups hold attribute particles, and correspond to the attributegroup tag in XML Schema, and ATTLIST definition in DTD. Any attributes correspond to the anyAttribute tag in XML Schema only.

Structure and character content (types and facets) for elements and attributes are encapsulated in complex types and simple types respectively. Every element has an anonymous complex type to store structure and character content. A complex type has an anonymous simple type for character content, and also a top-level model group and attribute group for structure content. Likewise, every attribute has an anonymous simple type to store character content. A simple type can be restricted by facets. Both complex and simple types can be extended or restricted, allowing true object-oriented re-use through inheritance.

Notations correspond to the notation tag in XML Schema and NOTATION definition in DTD. Entities correspond to the ENTITY definition in DTD only.

Annotations are the basis of text-based comments in the XML management system 100. Every BdsObject (that is, an object in the XML management system object model 5) can have annotations. An annotation holds a list of annotation contents, which are documentations or app infos. These correspond to the documentation and appinfo tags in XML Schema. XML comments in both XML Schema and DTD are encapsulated in documentation objects.

Keys, used during document validation, are an XML Schema concept. Uniques, keys, keyrefs, selectors, and fields map directly to the corresponding XML Schema tags. (These objects also allow RDBMS constraints to be modelled in corresponding XML schemata.)

While specific embodiments of the invention have been described above, it will be appreciated that the invention may be practiced otherwise than as described. The description is not intended to limit the invention.

The invention claimed is:

1. A system for managing XML schema in XML-based software, the XML schema comprising XML schema fragments regarding an XML-based computer environment, the system comprising:
    a computer configured to provide:
    a repository configured to store a manipulatable object model of the XML schema fragments, the object model: (a) comprising a plurality of objects, each object having a version, and (b) representing metadata about the XML schema fragments, wherein the metadata comprises information about which version of each object is latest in the system;
    user accessible means for manipulating said object model to define and modify (a) properties of objects thus represented, and (b) relationships between such objects;
    a link table for storing the relationships between objects, wherein the link table comprises: (a) a single link for storing a relationship between an element and a complex type, and (b) a collection for storing a relationship between a module and an element of the module;
    management function means for applying management functions to the objects, wherein the management functions comprise version control;
    means for extending said object model to handle a new type of object by automatically generating descendent class(es) for handling the new object within the object model and incorporating them into an XML management system runtime environment for participation in the object modeling process; and
    means for deploying XML schema fragments modelled by the object model into the XML-based computing environment.

2. The system for managing XML-based software according to claim 1, further comprising an import interface for parsing incoming data streams comprising new non-XML objects and regenerating said object model to include said new non-XML objects.

3. The system for managing XML-based software according to claim 1, wherein said metadata comprises information about one or more of the following:
    all objects that have been developed, when they were developed, by which developer, which definitions were used as a starting point, where the objects originated from, which variations were applied to the objects, and which references exist to other objects.

4. The system for managing XML-based software according to claim 1, wherein said management functions comprise one or more of the following: source control, impact analysis, and change management.

5. A method for managing XML schema in an XML-based software system, the XML schema comprising XML schema fragments regarding an XML-based computer environment, the method comprising:
    providing a repository configured to store a manipulatable object model of the XML schema fragments, the object model (a) comprising a plurality of objects, each object having a version, and (b) representing metadata about the XML schema fragments, wherein the metadata comprises information about which version of each object is latest in the system;
    manipulating said object model to define and modify (a) properties of objects thus represented, and (b) relationships between such objects;
    providing a link table for storing the relationships between objects, wherein the link table comprises: (a) a single link for storing a relationship between an element and a complex type, and (b) a collection for storing a relationship between a module and an element of the module;
    extending said object model to handle a new type of object by automatically generating descendent class(es) for handling the new object within the object model and incorporating them into an XML management system runtime environment for participation in the object modelling process;
    applying management functions to the objects, wherein the management functions comprise version control; and
    deploying XML schema fragments modelled by the object model into the XML-based computing environment.

6. A system for developing and managing XML schema in XML-based software, the system comprising:
  a computer configured to provide:
  an interactive, on-screen, computer environment;
  an extensible object model for representing (a) XML schema fragments, the object model comprising a plurality of objects, each object having a version, and (b) metadata about the XML schema fragments, wherein the metadata comprises information about which version of each object is latest in the system;
  management function means for applying management functions to the objects, wherein the management functions comprise version control; and
  means for developing XML schema fragments modelled by the object model into the environment,
  wherein
  the system includes a framework of object classes which effect the manipulation of objects within said object model, to define and modify (a) properties of objects represented by the model, and (b) relationships between such objects, in response to user interaction, and the persisting of objects between sessions in said environment, wherein the system includes a link table for storing the relationships between objects, wherein the link table comprises: (a) a single link for storing a relationship between an element and a complex type, and (b) a collection for storing a relationship between a module and an element of the module; and
  the system is updatable to handle a new type of object by the generation of the source code of one or more descendant classes of said object class framework for manipulating and persisting of said new type of object, whereby objects of such new type participate in said object model.

7. A system according to claim 6 wherein the source code is based on an at least semi-automatically derived characterisation of the new object type.

* * * * *